United States Patent [19]

Melnyk

[11] 4,258,460

[45] Mar. 31, 1981

[54] METHOD OF MAKING A HEAT EXCHANGER

[75] Inventor: William Melnyk, Lathrup Village, Mich.

[73] Assignee: McCord Corporation, Detroit, Mich.

[21] Appl. No.: 12,299

[22] Filed: Feb. 15, 1979

Related U.S. Application Data

[62] Division of Ser. No. 818,434, Jul. 25, 1977, Pat. No. 4,172,946.

[51] Int. Cl.³ .............................................. B23P 15/26
[52] U.S. Cl. ........................ 29/157.3 B; 29/157.3 A; 29/157.4; 113/118 A; 228/183; 285/223
[58] Field of Search ........ 29/157.4, 157.3 B, 157.3 A, 29/157.3 R, 157 R; 285/223; 228/183; 113/118 A

[56] References Cited

U.S. PATENT DOCUMENTS

| 368,611 | 8/1887 | Pratt | 29/157.4 |
|---|---|---|---|
| 1,102,163 | 6/1914 | Opperud | 29/157.4 |
| 3,415,315 | 12/1968 | Donaldson et al. | 29/157.3 B |
| 3,833,986 | 9/1974 | De Cicco | 29/157.3 B |

FOREIGN PATENT DOCUMENTS

| 648920 | 8/1937 | Fed. Rep. of Germany | 29/157.3 B |
|---|---|---|---|
| 1194349 | 6/1965 | Fed. Rep. of Germany | 285/223 |
| 64980 | 7/1925 | Sweden | 285/223 |

*Primary Examiner*—Milton S. Mehr
*Assistant Examiner*—V. K. Rising
*Attorney, Agent, or Firm*—McGlynn and Milton

[57] ABSTRACT

A heat exchanger assembly of the type having a heat transfer core element which includes a plurality of fins in parallel stacked relationship for defining heat transfer surfaces and a plurality of fluid carrying tubes extending transversely through the fins for defining a fluid circuit, the assembly including at least one tube-to-tube joint, the improvement comprising a solderless connection at the tube-to-tube joint wherein one of the tubes includes an end having an annular, outwardly extending shoulder followed by an inwardly tapered flared portion for receiving the outwardly tapered portion of the other portion and the other of the tubes including an end having an outwardly flared portion for receiving the outwardly tapered portion of the other tube end and an inwardly directed flange clinched over the shoulder of the other tube end to produce a solderless mechanical connection between the two tubes.

3 Claims, 9 Drawing Figures

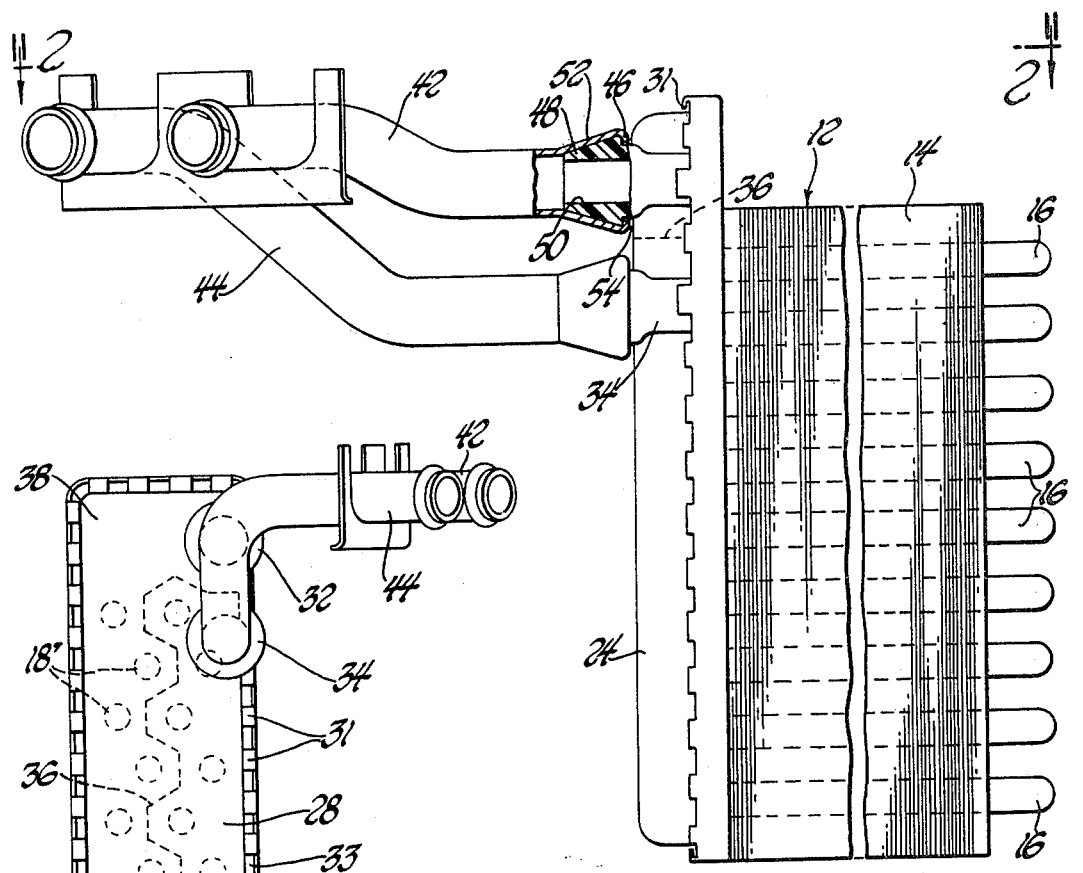
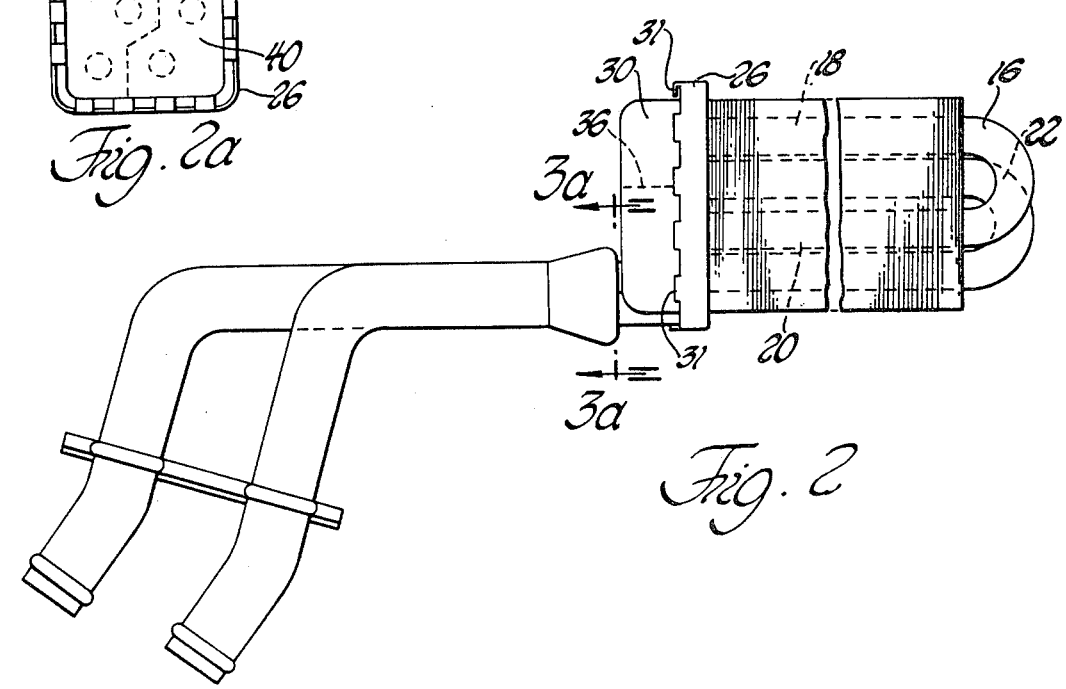

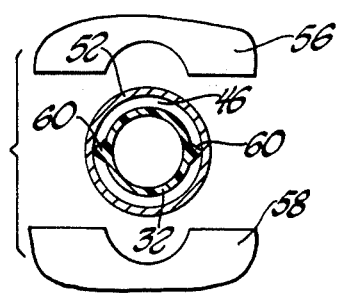
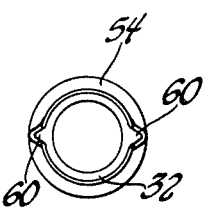
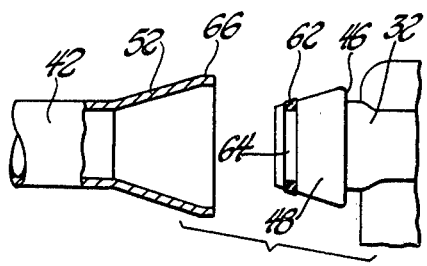
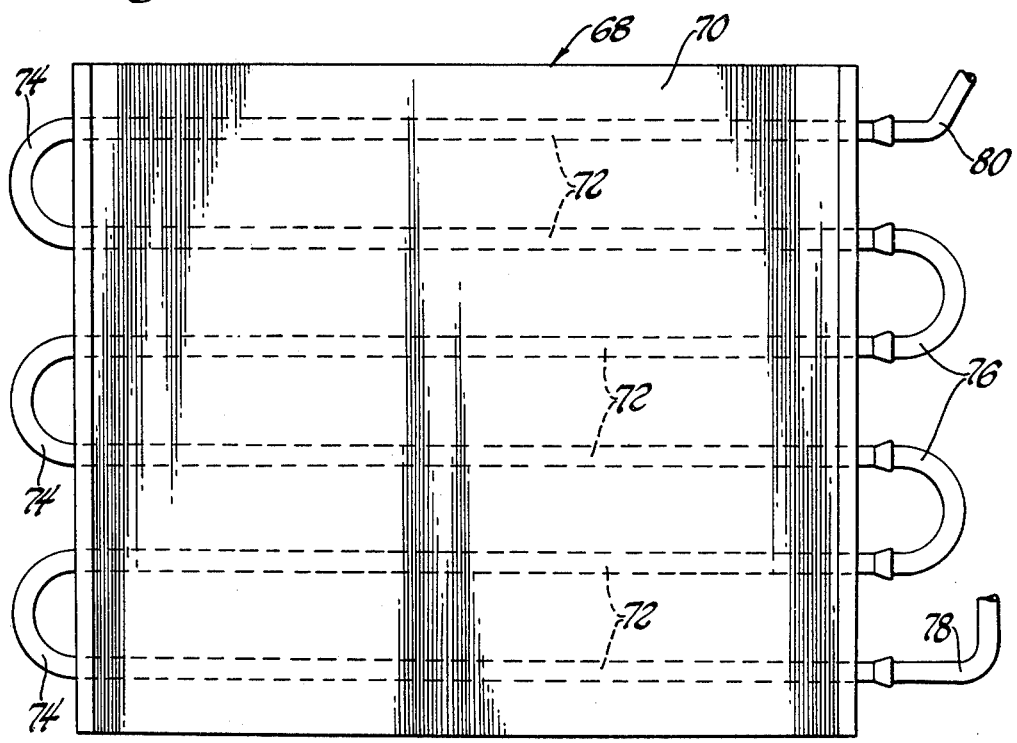
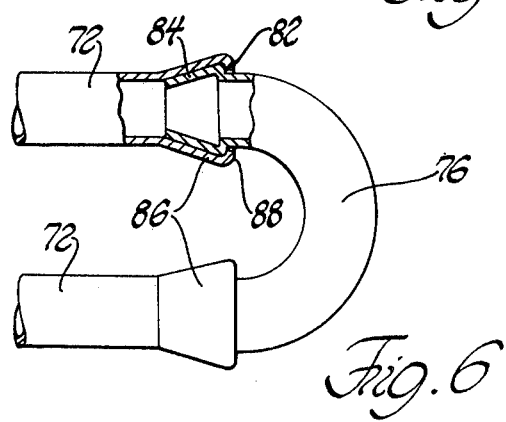
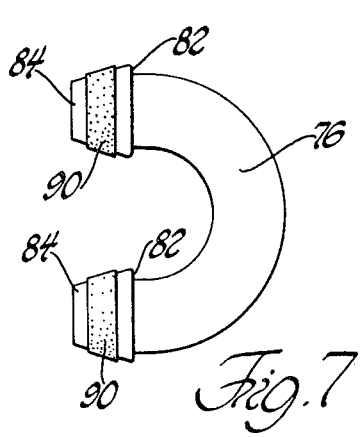

METHOD OF MAKING A HEAT EXCHANGER

This application is a divisional of Application Ser. No. 818,434, filed July 25, 1977, and now U.S. Pat. No. 4,172,946.

FIELD OF THE INVENTION

This invention relates to heat exchangers and a method for assembling the same which provides solderless joints between joined tubes.

BACKGROUND OF THE INVENTION

This invention is particularly adapted for use with heat exchanger assemblies of the type having a heat transfer core element which includes a plurality of fins in parallel stacked relationship for defining heat transfer surfaces and a plurality of fluid carrying tubes extending transversely through the fins for defining a fluid circuit. Heat exchanger assemblies of this type are commonly employed in the automotive industry as oil coolers, air heaters, and air conditioning system condensers.

In all such heat exchanger assemblies it is necessary to connect various tubes together to complete the assembly. In order to form the connections between two tubes it is conventional practice to use a bell and spigot type joint which is fluxed and soldered. In other words, the end of one tube is expanded to increase its internal diameter so that it is capable of receiving the end of the other tube which is to be connected to it. Thereafter, the tubes are permanently connected by a soldering operation which normally includes the use of a fluxing material to insure good bonding and a pressure tight seal.

Such tube joints require a significant amount of heat since the tube joint must be heated to a sufficient temperature to melt the solder material. Additionally, radiator assemblies including soldered joints are normally steam cleaned to remove flux material which may have flowed into the interior of the tubes. A solderless joint, on the other hand, does not require heat for forming a connection between tubes and the resulting assembly normally does not require steam cleaning. Hence, a significant energy saving can be achieved.

It is also significant to note that the source of heat for soldering heat exchanger assemblies is normally natural gas. In recent years, the supply of natural gas has been reduced drastically for manufacturing facilities in certain parts of the country. Manufacturing facilities whose operations are highly dependent on a large and continuous supply of natural gas can be shut down in the event of a shortage. Therefore, the elimination of soldered joints in heat exchanger assemblies is attractive since it eliminates a portion of the dependency on natural gas in the manufacturing operation.

SUMMARY OF THE INVENTION

A solderless joint is provided for a heat exchanger assembly including at least one tube-to-tube joint by forming an end portion on one of the tubes so that it includes an annular outwardly extending shoulder followed by an inwardly tapered portion. The other of the tubes is formed with an end having an outwardly flared portion for receiving the inwardly tapered portion of the other tube end. The end of the outwardly flared portion is clinched over the shoulder of the other tube to form an inwardly directed flange. The flange grips the shoulder to create an exceptionally strong mechanical connection between the two tubes and eliminates the need for a solder joint. If required to insure a pressure tight seal between the tubes, an O-ring or sealant may be used.

STATEMENT OF PRIOR ART

The conventional soldered joint employed in heat exchanger assemblies is described in U.S. Pat. No. 1,931,467 granted Oct. 17, 1933. No prior art is known to applicant which discloses the solderless tube-to-tube connection described and claimed herein.

BRIEF DESCRIPTION OF THE DRAWINGS

Other advantages of the present invention will be readily appreciated as the same becomes better understood by reference to the following detailed description when considered in connection with the accompanying drawings wherein;

FIG. 1 is a plan view of a heat exchanger assembly incorporating the solderless joint of the instant invention;

FIG. 2 is a side elevational view of the heat exchanger assembly of FIG. 1;

FIG. 2a is a left end view of FIG. 1;

FIG. 3 is a view showing a mechanical device suitable for joining the two tubes;

FIG. 3a is a cross-sectional view taken along line 3a—3a of FIG. 1;

FIG. 4 is an exploded view of an alternate embodiment of the tube joint of the instant invention;

FIG. 5 is a plan view of a second embodiment of a heat exchanger assembly employing the tube joint of the instant invention;

FIG. 6 is a plan view, partly in cross section, showing the tube joint employed in the heat exchanger assembly of FIG. 5 and FIG. 7 is a plan view of one element of the heat exchanger assembly shown in FIG. 5 including one half of the tube joint.

DETAILED DESCRIPTION OF THE INVENTION

Referring more specifically to the drawings, a typical automotive heat exchanger of the type with which the instant invention is particularly applicable is shown generally at 10 in FIG. 1.

The heat exchanger assembly 10 includes a heat transfer core element generally indicated at 12. This heat transfer core element is conventional in that it includes a plurality of fins 14 in parallel stacked relationship for defining heat transfer surfaces and a plurality of fluid carrying tubes 16 extending transversely through the fins 14 for defining a fluid circuit. Heat in the fluid is transferred through the tubes to the fins which are swept by a cooling fluid, normally ambient air, to cool the fins.

The fins 14 and tubes 16 are normally made of a metallic material having good heat transfer properties, such as copper and aluminum alloys. In the heat transfer core element shown in FIGS. 1, 2 and 3 the fluid circuit is formed with a plurality of tube segments each of which includes a pair of parallel tube sections 18 and 20 which are joined by a U-shaped section 22 as shown in FIG. 2. The open ends of the tube segments communicate with a header 24.

The header 24 comprises a multi-part assembly which includes a base portion 26 including a plate 28 having holes through which the ends of the tube sections 18' and 20' extend. A cover 30 is sealed to the base portion 26 by suitable sealing members and is connected thereto by mechanically clinching tangs 31 over a flange 33 which extends outwardly about the periphery of the cover 30.

The header 24 also includes an inlet tube 32 and an outlet tube 34. Since the cover 30 of the header assembly 24 is an integral injection molded plastic part, the inlet and outlet tube 32 and 34 are also plastic. As will be described in more detail herein, the plastic inlet and outlet tubes must be joined to a metal extension tube.

In order to define a fluid circuit, the header 24 includes a partition 36 which separates the pairs of tube ends as well as the inlet and outlet tubes 32 and 34. Hence, fluid entering inlet 32 flows into the inlet section 38 of the header 24 and then from the header 24 down one side 18 of the tubes 16. The fluid then returns to the other section 40 of the header 24 through the opposite sides 20 of the tubes 16 and then exits the heat exchanger assembly through the outlet tube 34.

In this type of heat exchanger assembly two tube-to-tube joints are required. As suggested above, the inlet tube 32 must be connected to a tube extension 42 and the outlet tube 34 must be connected to a tube extension 44. These extension tubes 42 and 44 are then connected during the assembly of the vehicle to the source of the fluid which must be cooled, e.g. the crankcase, A/C compressor or the like.

This invention is directed to a solderless connection at the tube-to-tube joint between the inlet and outlet tubes 32 and 34 and their tube extensions 42 and 44. More specifically, and using the inlet tube 32 as an example, the end of the inlet tube 32 is formed to include an annular, outwardly extending shoulder 46 which is followed by an inwardly tapered portion 48. The inlet tube 32 includes an internal bore 50 which communicates with the interior of the header 24 to provide fluid communication between the header and the tube extension.

The end of the tube extension 42 includes an outwardly flared portion 52 which has an internal dimension capable of snugly receiving the tapered portion 48 of the inlet tube 32. When the two tube ends are brought together, the end of the tapered portion 52 is mechanically clinched over the shoulder 46 of the inlet tube 32 to form an inwardly directed flange 54. The inwardly directed flange 54 mechanically locks the two tubes together. As shown schematically in FIG. 3, this operation may be accomplished by a simple mechanical device having a pair of oppositely directed guillotine-like plates 56 and 58 which are supported in a suitable fixture. The guillotine-like plates approach the end of the flared portion 52 from opposite sides. The plates engage the flared portion 52 and forces it generally radially inwardly to form the flange 54. It has been found that this operation not only forms the flange but also forcefully draws the two tubes together thus wedging the tapered section tightly into the flared section. Obviously, other means for clinching the flange over the shoulder 46 would be apparent to those having ordinary skill in the art.

In some heat exchanger assembly applications it is imperative that relative rotation between the tubes be prevented. In the heat exchanger assembly shown in FIGS. 1-3 this is accomplished in the following manner. On the tube including the inwardly tapered end portion, in this case the inlet and outlet tubes 32 and 34, at least one outwardly extending projection 60 is formed immediately adjacent the shoulder 46. Preferably, projections 60 are formed on opposite sides of the tube ends. It is also noted that the projections are formed in the plane in which the two guillotine-like members meet.

As shown in FIG. 3a, when the flange 54 is formed, the metal surrounds the projections 60 thereby forming a nonrotatable connection. The projections 60 prevent rotation of the metal tube 42.

Since the fluid circuit in a heat exchanger is usually pressurized it is essential that the tube-to-tube joint have an adequate seal. A seal can be provided between the tubes in the following ways. In the embodiment shown in FIG. 4 an O-ring 62 is located in a seat formed in the tapered portion 48 of the tube 32. Alternatively, or in addition to the O-ring 62, a layer of liquid sealant may be applied to the external surface of the tapered portion 42 for insuring a pressure seal between the two tubes. This arrangement is shown in FIG. 7 which will be described in greater detail.

FIG. 4 also shows the initial configuration of the end of the metal extension 42. Specifically, the flared portion 52 comprises a continuous, diverging skirt which terminates in an annular portion 66 which extends beyond the shoulder 46 of the tube 32 when the two tubes are in assembled relationship. The annular portion 66 is clinched around the shoulder 46 as described above.

Another type of heat exchanger assembly is shown generally at 67 in FIG. 5. This heat exchanger assembly also includes a heat transfer core element, generally indicated at 68, including a plurality of fins 70 in parallel stacked relationship for defining heat transfer surfaces. Additionally, the heat transfer core element includes a plurality of fluid carrying tubes 72 extending transversely through the fins 70 for defining a fluid circuit. In this embodiment the tubes 72 form a continuous, serpentine fluid circuit through the fins 70. As in the embodiment shown in FIG. 1, tube segments comprise U-shaped segments having elongated legs 72 which are joined by U-bends 76. Adjacent pairs of tubes are joined by separate U-shaped pieces of tube 76 which heretofore have required two soldered joints. An inlet tube 78 and an outlet tube 80 are also joined to opposite ends of the fluid circuit. Hence, in this type of heat exchanger assembly a relatively large number of tube-to-tube connections are required.

As shown in FIGS. 6 and 7, a solderless tube-to-tube connection is provided by forming the U-shaped pieces of tube 76 with ends having an outwardly extending shoulder 82 followed by an inwardly tapered portion 84. This type of end is also formed on the ends of the inlet and outlet tubes 78 and 80. The ends of the straight tubes 72 include an outwardly tapered portion 86 terminating in a skirt which is clinched over the shoulder 82 to form an inwardly directed flange 88. It is noted that, when assembled, the end of the outwardly flared portion 86 extends slightly beyond the shoulder 82 to provide sufficient material for the flange 88.

In order to insure a pressure tight seal, the external surfaces of the inwardly tapered portions 84 are coated with a thin layer of a suitable sealing material 90.

Again, it has been found that the clinching operation which forms the flanges 88 over the shoulders 82 draws the two tubes tightly together to form an exceptionally strong mechanical connection without requiring a solder joint.

The invention has been described in an illustrative manner, and it is to be understood that the terminology which has been used is intended to be in the nature of words of description rather than of limitations.

Obviously, many modifications and variations of the present invention are possible in light of the above teachings. It is, therefore, to be understood that the invention may be practiced otherwise than as specifically described yet remain within the scope of the appended claims.

The embodiments of the invention in which an exclusive property or privilege is claimed are defined as follows:

1. A method of manufacturing a heat exchanger assembly including solderless tube-to-tube joints comprising the steps of assembling a subassembly including a plurality of fins in parallel stacked relationship for defining heat transfer surfaces and a plurality of fluid-carrying tubes extending transversely through said fins for defining a fluid circuit, said subassembly including at least one tube end requiring connection to the end of another tube, providing a tube end on one of said tubes with an annular outwardly extending shoulder followed by an inwardly tapered portion and at least one outwardly extending projection on said inwardly tapered tube end immediately adjacent said shoulder, providing the tube end of the other of said tubes with an outwardly flared portion having an internal size capable of receiving said inwardly tapered portion, the length of said flared portion being slightly greater than the length of said inwardly tapered portion, assembling said tubes by inserting said inwardly tapered portion into said outwardly flared portion until the end of said outwardly flared portion extends beyond said shoulder and mechanically clinching the end of said outwardly flared portion over said shoulder and forcibly wedging said tapered portion tightly into said flared portion by forming an inwardly extending flange surrounding said projection thereby joining said tubes together to prevent relative rotation between said tubes.

2. The method set forth in claim 1 including the step of locating an annular sealing member on the exterior surface of said inwardly tapered portion.

3. The method set forth in claim 1 including the step of applying a layer of sealing material to one of the mating surfaces of said tube ends.

* * * * *